United States Patent
Wolf et al.

(10) Patent No.: US 6,764,189 B2
(45) Date of Patent: Jul. 20, 2004

(54) AUTOMOBILE MIRROR SWIVELING DEVICE

(75) Inventors: Wilhelm Wolf, Petersaurach (DE); Josef Boegelein, Sachsen (DE); Wolfgang Seiboth, Bad Windsheim (DE); Heinrich Lang, Ergersheim (DE)

(73) Assignee: Oechsler AG, Ansbach (DE)

( * ) Notice: Subject to any disclaimer, the term of this patent is extended or adjusted under 35 U.S.C. 154(b) by 89 days.

(21) Appl. No.: 10/276,659

(22) PCT Filed: Mar. 28, 2001

(86) PCT No.: PCT/EP01/03524
§ 371 (c)(1),
(2), (4) Date: Nov. 18, 2002

(87) PCT Pub. No.: WO01/89880
PCT Pub. Date: Nov. 29, 2001

(65) Prior Publication Data
US 2003/0123166 A1 Jul. 3, 2003

(51) Int. Cl.[7] .............................................. C02B 5/22
(52) U.S. Cl. .................... 359/876; 359/871; 359/872; 359/873; 359/874; 359/875; 248/487
(58) Field of Search ................ 359/876, 871, 359/872, 874, 875

(56) References Cited

U.S. PATENT DOCUMENTS 3,942,879 A * 3/1976 Pledger ..................... 359/226
4,915,493 A * 4/1990 Fisher et al. ................ 359/874
5,546,240 A * 8/1996 Perry et al. ................. 359/871
5,734,516 A * 3/1998 Sayede ....................... 359/871
6,050,537 A * 4/2000 Fimeri ........................ 248/481
6,315,427 B1 * 11/2001 Simon ........................ 362/147
6,364,496 B1 * 4/2002 Boddy et al. ............... 359/877
6,550,925 B1 * 4/2003 Deschaseaux .............. 359/872

FOREIGN PATENT DOCUMENTS

| DE | 4312847 | 10/1994 |
| FR | 2471887 | 6/1981 |
| JP | 54153447 | 12/1979 |
| JP | 55025666 | 2/1980 |

* cited by examiner

Primary Examiner—Mohammad Sikder
(74) Attorney, Agent, or Firm—Horst M. Kasper

(57) ABSTRACT

The invention relates to a swiveling device (11) of the support panel (12) of an exterior automobile mirror that can be adjusted by means of a motor. Said device functions in a stable manner. The panel (12) is fixed on a housing (13) in such a way that it can swivel, by means of four threaded rods (18—18.18'—18'). Said housing is to be mounted in a fixed position. A geared motor (17, 17') is provided in said housing for each of the two swiveling directions (11), which are orthogonal in relation to each other. Said geared motors are kinematically connected to two threaded rods (24—24) by a toothed wheel (19, 19') and by threaded bushings (24—24) which are also toothed on the outside. Said threaded rods (18—18) are diametrically opposite each other in relation to the coaxial axes of rotation of the wheels (19, 19') and can be moved in opposite directions to each other.

3 Claims, 1 Drawing Sheet

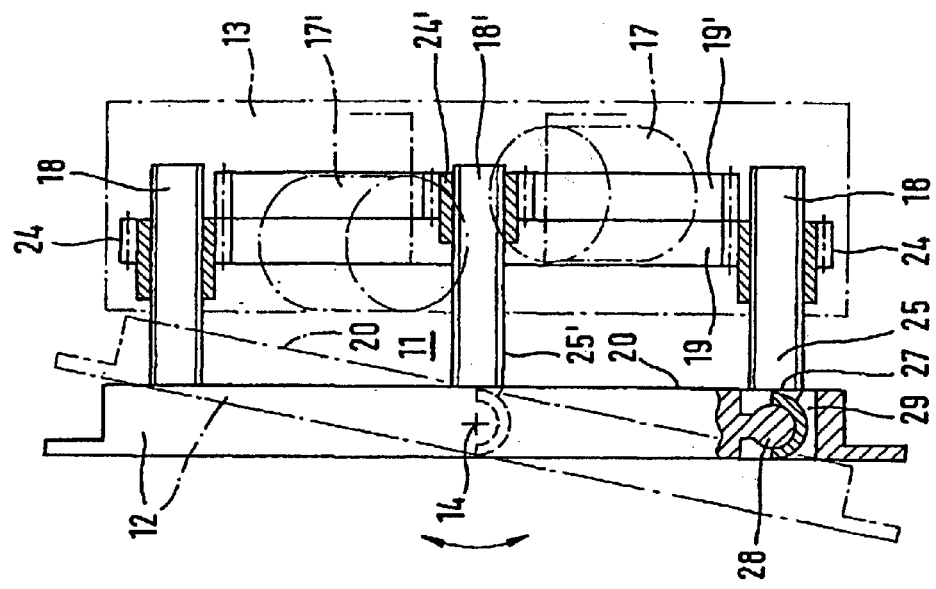
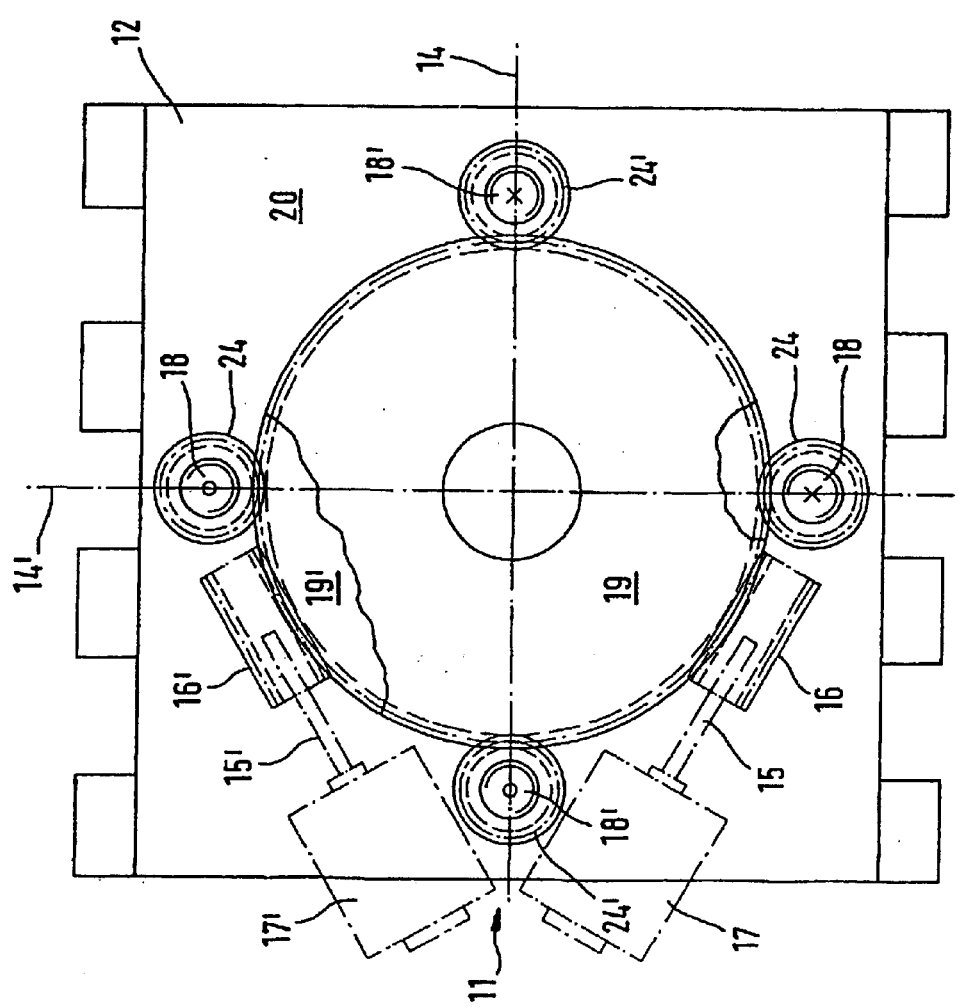

AUTOMOBILE MIRROR SWIVELING DEVICE

CROSS-REFERENCE TO RELATED APPLICATIONS (not applicable)

STATEMENT REGARDING FEDERALLY SPONSORED RESEARCH OR DEVELOPMENT (Not applicable)

INCORPORATION-BY-REFERENCE OF MATERIAL SUBMITTED ON A COMPACT DISC (See 37 CFR 1.52 (e)(5) and MPEP 608.05. Computer program listings (37 CFR 1.96(c)), "Sequence Listings" (37 CFR 1.821(c)), and tables having more than 50 pages of text are permitted to be submitted on compact discs.) or REFERENCE TO A "MICROFICHE APPENDIX" (See MPEP §608.05(a). "Microfiche Appendices" were accepted by the Office until Mar. 1, 2001.)

(not applicable)

BACKGROUND OF THE INVENTION (not applicable)

(1) Field of the Invention (not applicable)

The present invention relates to a motorized swiveling device according to the preamble of the main claim.

A swiveling device of this species is known from European Patent Application 0 316 055 A1 in the form of a housing to receive one reversible small electric motor each for the coordinated drive of each of two tappet-like linear actuators, onto whose front ends a mirror support plate is linked and which may be extended out of the housing and/or withdrawn therein opposite to one another. In this way, they tilt the support plate around an axis centrally transverse to the connection line between the two linear actuators. The transmission of movement from the motor to the threaded rod assigned thereto is performed in each case using a pinion on the motor shaft, which rotates a threaded bushing, axially fixed on housing, via external teeth and thus linearly displaces the threaded rod, whose external thread is engaged with the internal thread of the bushing.

(1) Description of Related Art including information disclosed under 37 CFR 1.97 and 1.98.

The requirement of having to simultaneously use two motorized drives acting oppositely coordinated for this simple pivot movement of a mirror support plate around a pivot axis is, however, very costly. In addition, the operational reliability is impaired due to the danger of not exactly synchronized operation; if the two linear actuators are not moved exactly opposite by their motors, then a reproducible swiveling movement of the support plate around a predetermined fixed geometric axis does not occur, but rather this pivot axis experiences a lateral displacement.

Moving a pendulum arm in pivoting movement via an eccentric linkage to convert a rotational movement into a rapid and high-capacity oscillation, for example, for driving reciprocating saws, pump plungers, or hay balers has been known per se from U.S. Pat. No. 1,147,896 for a long time. Ideas for a reproducible, mechanically stable adjustment of the slant of a mirror using an electric motor have obviously not been derived in the professional world from this old publication.

Providing a rotating disk cam having crown gear teeth and a motor shaft pinion, which engages therein with radial orientation to the cam, for a driven, periodical sequential control of multiple valves for water management in a household washing machine has also been known for long time, from U.S. Pat. No. 4,644,809. The cam is equipped with two concentric peripheral stepped grooves having internal teeth, in which the actuating shafts of the stationary valves engage, which are equipped with gear wheels of different diameters and therefore correspondingly engage to different depths in the grooves, in order to be opened and closed again periodically but at different speeds as a function thereof during rotation of the disk cam. However, automobile mirrors may not be adjusted using such rotational sequences of valve shafts.

BRIEF SUMMARY OF THE INVENTION

In consideration of the shortcoming described above, the present invention is based on the technical object of designing a swiveling device according to the species so it is more functionally robust and, nonetheless, more cost-effective due to lower outlay for individual parts.

This object is achieved according to the present invention in that, according to the features essentially indicated in the main claim, for the motorized pivot movement, the two threaded rods assigned to a pivot axis are driven by a rotational link both to one another and to a shared motor. For this purpose, there is a gear, which is positively linked via its teeth to each of the two threaded bushings for the threaded rods to drive them, lying approximately parallel to the mirror plate in the flat housing, which both threaded rods, which are mounted so they rotate together, are moved into and/or out of in their longitudinal directions, transverse to the main plane of the housing. The bushings are rotatably mounted parallel to the rotational axis of the gear and diametrically opposed to one another axially on the gear and fixed to the housing. The electric reversible servomotor shared by the two threaded rods of one pivot axis preferably has its axis in the plane of the gear and engages, for example, with a worm gear, with which the motor shaft is equipped, in external (radial or crown) teeth of the gear. These are preferably the same teeth which mesh with the external teeth of both threaded bushings.

A similar pair of threaded rods, jointly driven by a further such reversing motor via its gear and its bushings, may be positioned aligned parallel to the first described but transverse thereto. In case of another positively driven rotational link, its threaded bushings therefore mesh with a separate gear wheel drivable by motor, which has a somewhat smaller diameter and is mounted on or under the first gear described, in order to be able to perform the pivot movement of the plate in an axis orthogonal to the first axis described as well—and therefore, due to their superposition, in any arbitrary spatial direction. With this supplementation, according to the present invention, in a pivot device operating without jamming, the support plate of a truck external mirror adjustable using a motor is mounted in an articulated way on four threaded rods which may be moved different distances out of the housing, which are moved opposite to one another in pairs via a (gear)wheel by a reversible drive motor assigned to the gear.

For a more detailed explanation of the present invention and its alterations and refinements, reference is made to the sub-claims and to the following description of a preferred exemplary embodiment of the achievement of the object according to the present invention, which is illustrated in the

BRIEF DESCRIPTION OF THE SEVERAL VIEWS OF THE DRAWING(S)

FIG. 1 shows, in a partial axial longitudinal section through a threaded rod, a housing, to be mounted fixed on object, having the swiveling device according to the present invention for swiveling a carrier plate in all spatial directions and FIG. 2 shows the arrangement from FIG. 1 with the housing removed in a rear horizontal projection.

DETAILED DESCRIPTION OF THE INVENTION

The arrangement of swiveling device 11 according to the present invention, which is driven by motor, for a support plate 12 to receive, for example, a automobile rear view mirror adjustable by motor, is located inside a flat housing 13, which is to be mounted fixed. An electric reversible low-voltage drive motor 17, 17' is positioned therein for each of two orthogonal pivot movement possibilities (pivot axes 14, 14') of plate 12. The motor is mechanically linked via an outside pinion 16, 16', for example, on its motor shaft 15, 15' (FIG. 2), and a gear 19, 19', which is concentrically rotatable at the intersection of the pivot axes 14/14' and lies flat in the housing, and via rotatably mounted threaded bushings 24, to a pair of threaded rods 18—18, 18'—18', which are mounted so they are rotationally fixed but are movable lengthwise, preferably for positive driving via teeth and/or threads. Therefore, threaded rods 18, 18' may be displaced—guided parallel to one another in their bushings 24—along a direction approximately orthogonal to the main plane of housing 13 and plate 12, namely into housing 13 on one side and simultaneously to the same degree out of the housing on the diametrically opposite side, and vice versa, depending on the rotational direction of motor 17, 17' and gear 19, 19'.

Free front end 27 of end piece 25, 25' of threaded rod 18, 18', which projects out of housing 13 in the direction toward plate back 20, is connected to plate 12 in an articulated way after bridging a free distance between housing 13 and plate back 20. Plate 12 is thus adjustably mounted in front of housing 13, using four threaded rods 18, 18', which project to different distances out of housing 13, may alternately have compressive and tensile forces applied to them, and are resistant to buckling, so the plate is adjustable in practically any desired spatial direction. As shown in FIG. 1, in this case connection region 28 of a threaded rod 18, 18' is preferably inside plate 12, for example, implemented as a ball joint loaded transverse to the overlap in a hollow 29, which projects as a pocket hole into the back of plate 12 or, as shown, as a through hole which traverses the entire plate. Such a linkage for movement transmission may be implemented using plastic injection molded parts without problems, cost-effectively, and functionally reliably, even when subject to vibration stress.

A threaded bushing 24, 24' (cf. also FIG. 2), which is mounted axially fixed to the housing but rotatably, for coaxially receiving each of threaded rods 18, 18', is used as a lengthwise guide fixed to the housing for non-rotatably mounted threaded rods 18, 18' and simultaneously as a gear element between the rods and (gear)wheel 19, 19'. The external teeth of gear 19, 19', which are radial teeth, mesh with external teeth of each of its two bushings 24—24, 24'—24', and their inner threads each mesh with the external threads of assigned rods 18—18, 18'—18'.

If one of the two motors 17, 17' now rotates its (gear) wheel 19, 19', one of threaded rods 18, 18; 18', 18' is simultaneously moved out of housing 13 and the diametrically opposing rod of the pair is moved in by the same amount via threaded bushings 24—24, 24'—24', through which plate 12 is pivoted geometrically exactly and mechanically stably around axis 14 and/or 14'.

Since threaded rods 18, 18' are, as illustrated, linked to the back of plate 12 in pairs, diametrically opposite one another in relation to the intersection of both pivot axes 14/14' and with opposing introduction of force, this results in a vibration-resistant symmetric suspension of plate 12 on supporting housing 13 and trouble-free adjustment procedures, because, using the pivot movement (indicated in FIG. 1 for axis 14 by the curved double arrow in front of mirror support plate 12), a tensile load and, simultaneously, a diametrically opposed compressive or transverse load is always performed against mirror support plate 12 at a plate connection 28.

What is claimed is:

1. An automobile mirror swiveling device (11) comprising:
a mirror support plate (12), which is pivotable around two orthogonal pivot axes (14, 14') in relation to a housing (13) fixed on an object, the plate being supported by two threaded rods (18—18, 18'—18') per pivot axis (14, 14'), which in turn each extend through a threaded bushing (24, 24') having an additional external thread, these threaded bushings (24, 24') being rotatably mounted on the housing (13) and rotationally linked to one another in such a way, that each of the pair of threaded rods (18—18, 18'—18') of a pivot axis (14, 14'), through rotation of its pair of threaded bushings (24—24, 24'—24'), move one threaded rod (18, 18') different distances into the housing (13) and simultaneously move the other threaded rod (18, 18') out of the housing (13) on the opposite side and in this way pivot the mirror support plate (12) around one of the two pivot axes (14, 14'), one motor (17, 17'), having a pinion (16, 16') and a gear (19, 19'), rotatable by this pinion (16, 16'), being provided per pivot axis (14, 14') for this purpose, the gear being provided with external teeth, which engage with both the pinion (16, 16') of the motor (17, 17') and with the external threads on the two threaded bushings (24, 24') for this pivot axis (14, 14').

2. The swiveling device according to claim 1, wherein each of the two motors (17, 17') is oriented parallel to the main plane of one of the two gears (19, 19') assigned to it and is equipped with a worm gear (16, 16'), which meshes with the external teeth of the assigned gear of the two gears (19, 19'), and which is also engaged with the two threaded bushings (24, 24') assigned to this gear (19, 19'), which are offset in relation to the pinion (16, 16') around the circumference of the respective gear (19, 19').

3. The swiveling device according to claim 1, two gears (19, 19'), which lie coaxially on one another, are provided, on each of which one of two pairs of bushings (24—24, 24'—24'), which are aligned orthogonally to one another, are engaged with their teeth for axial displacement of their threaded rods (18—18, 18'—18').

* * * * *